United States Patent [19]

Minegishi

[11] Patent Number: 5,290,208
[45] Date of Patent: Mar. 1, 1994

[54] SERIES OF SPEED INCREASING AND REDUCTION GEAR EMPLOYING AN INSCRIBED MESHING TYPE PLANETARY GEAR CONSTRUCTION

[75] Inventor: Kiyoji Minegishi, Aichi, Japan
[73] Assignee: Sumitomo Heavy Industries, Ltd., Tokyo, Japan
[21] Appl. No.: 960,645
[22] Filed: Oct. 14, 1992
[30] Foreign Application Priority Data
   Feb. 18, 1992 [JP] Japan ............................ 4-069218
[51] Int. Cl.$^5$ ............................................. F16H 1/28
[52] U.S. Cl. .................................. 475/178; 475/179; 475/180; 475/176
[58] Field of Search ................. 475/178, 179, 176, 180
[56] References Cited
   U.S. PATENT DOCUMENTS

| | | | |
|---|---|---|---|
| 1,867,492 | 7/1932 | Braren | 475/178 X |
| 4,471,672 | 9/1984 | Butterfield et al. | 475/178 X |
| 4,898,065 | 2/1990 | Ogata et al. | 475/178 X |
| 4,909,102 | 3/1990 | Haga | 475/179 X |
| 5,123,884 | 6/1992 | Kondoh et al. | 475/179 X |

*Primary Examiner*—Leslie A. Braun
*Assistant Examiner*—Daniel Wittels
*Attorney, Agent, or Firm*—Nikaido, Marmelstein, Murray & Oram

[57] ABSTRACT

A series of speed increasing and reduction gear having an inscribed meshing type planetary gear construction, in which within the same frame number (sub-series) with a tie-in dimension to a mating machine being constant, on both high and low speed change ratio sides, sufficient dynamical strength is secured, parts may be used in common with each other, and general-use bearings which are low in cost and high in accuracy can be employed. To realize this, within the same frame number with a tie-in dimension to a mating machine being constant, a plurality of low speed change ratios to high speed change ratios are prepared, and despite the preparation of the plural reduction ratios, a diameter D of an input shaft 101 and an outside diameter D3 of an eccentric bearing 104$a$ are set to be the same, the low reduction ratio side comprising a combination of the eccentric bearing 104$a$ having a large inside diameter D5 and an eccentric body 103$a$ having a large outside diameter (=D5) while the high reduction ratio side comprising a combination of an eccentric bearing having a small inside diameter D6 (D5>D6) and an eccentric body having a small outside diameter (=D6).

1 Claim, 8 Drawing Sheets

SERIES OF SPEED INCREASING AND REDUCTION GEAR EMPLOYING AN INSCRIBED MESHING TYPE PLANETARY GEAR CONSTRUCTION

BACKGROUND OF THE INVENTION

1. Field of the Invention

This invention relates to a series of speed increasing gear and devices reduction gear employing an inscribed meshing planetary gear construction which is preferably utilized as a speed increasing gear or a reduction gear, more particularly, a small-sized speed increasing gear or a reduction gear in which a high output is required.

2. Description of the Prior Art

In the prior art, it is widely known to provide an speed increasing gear or a reduction gear employing an inscribed meshing planetary gear construction comprising a first shaft, an eccentric body mounted on the first shaft, an eccentric bearing mounted in the outer periphery of the eccentric body, an external-tooth gear mounted in the outer periphery of the eccentric bearing in a state where the external-tooth gear can be rotated eccentrically around the first shaft, an internal-tooth gear with which the external-tooth gear is inscribed and meshed, and a second shaft connected to the external-tooth gear through means for transmitting only the rotation component of the external-tooth gear.

An example of the prior art of this construction is shown in FIGS. 5 and 6. This prior art is constructed such that first shaft is applied as an input shaft, second shaft is applied as an output shaft and at the same time, the construction is utilized as a reduction gear by fixing the internal-tooth gear.

Eccentric bodies 3a, 3b are fitted to the input shaft 1 with a predetermined phase difference (180° in this example). The eccentric bodies 3a, 3b are integrated into one body. Two external-tooth gears 5a, 5b are supported on each of these eccentric bodies 3a, 3b through eccentric bearings 4a, 4b. A plurality of inner roller holes 6 are provided in the external-tooth gears 5a, 5b. An inner pin 7 and an inner roller 8 are fitted in these roller holes.

As the eccentric bearings 4a, 4b, cylindrical roller bearings are employed in terms of demand of strength, and a part of the external-tooth gears 5a, 5b serves as the outer races thereof.

A main object of providing two external-tooth gears (in plural rows) is to increase a transmittance capacity, maintain a strength and keep a rotational balance.

External teeth 9 such as trochoidal teeth or circular teeth etc. are provided at outer circumferences of the external-tooth gears 5a, 5b. The outer teeth 9 are inscribed and meshed with the internal-tooth gear 10 fixed to a casing 12. The internal teeth of the internal-tooth gear 10 are constructed such that an outer pin 11 is loosely fitted to an inner pin hole 13 and held to be easily rotatable.

An inner pin 7 passing through the external-tooth gears 5a, 5b is tightly fixed to or fitted to a flange part 14 of the output shaft 2.

When the input shaft 1 is rotated once, the eccentric bodies 3a, 3b also rotate once. The external-tooth gears 5a, 5b oscillatebly rotate around the input shaft 1 through this one revolution of the eccentric bodies 3a and 3b. However, since the rotation is restricted by the internal-tooth gear 10, the external-tooth gears 5a, 5b almost merely perform oscillation while being inscribed with the internal-tooth gear 10.

Now, it is assumed that the number of teeth of the external-tooth gears 5a, 5b is N and the number of teeth of the internal-tooth gear 10 is N+1, then the difference between the numbers of teeth is 1. Consequently, the external-tooth gears 5a, 5b are displaced by one tooth relative to the internal-tooth gear 10 fixed to the casing 12 every time the input shaft 1 is rotated. This means that one revolution of the input shaft 1 is decelerated to a revolution of $-1/N$ of the internal-tooth gear.

Oscillation component of the external-tooth gears 5a, 5b is absorbed by clearances between the inner roller holes 6 and the inner pins 7 and then only the revolution component is transmitted to the output shaft 2 through the inner pins 7.

In this case, the inner roller holes 6a, 6b and the inner pins 7 (inner rollers 8) form an "isokinetic inscribed meshing mechanism".

As a result, finally, a reduction of reduction ratio $-1/N$ can be accomplished.

In the example of this prior art, the internal-tooth gear of the inscribed meshing planetary gear construction is fixed, the first shaft is an input shaft and the second shaft is an output shaft. However, a reduction gear can also be constructed by fixing the second shaft and applying the first shaft as an input shaft and the internal-tooth gear as an output shaft. Furthermore, a speed increasing gear can also be constructed by reversing these inputs and outputs.

As described above, the inner pin 7 has a function of forming an circular tooth acting as one of elements of the isokinetic inscribed meshing mechanism constructed with the inner roller holes 6a, 6b, and also has another function acting as a carrier member for transmitting a rotational force of a rotation of external-tooth gears 5a, 5b to the output shaft 2. In particular, in order to keep a superior former function, it was essential to provide inner rollers 8 capable of being freely rotated around the outer circumference of the inner pins 7. The inner roller 8 presents a problem of expensive cost due to the fact that the material must be hard and both outer and inner circumferences thereof must be coaxially and accurately machined.

In view of this fact, an idea has been proposed that the function which forms a circular tooth of one of the elements of the isokinetic inscribed meshing mechanism and another function which acts as a carrier member for transmitting a rotational force of the external-tooth gears 5a, 5b to the output shaft 2 be separated, and even if the inner roller 8 is eliminated, it has a similar performance to a mechanism having an inner roller 8.

This hypothetical structure is illustrated in FIGS. 7 and 8.

This structure comprises a means for transmitting a rotational component of the external-tooth gears, the inner pin 7 capable of constructing the isokinetic inscribed meshing mechanism relative to the inner pin holes (corresponding to the inner roller holes) 19a, 19b arranged in the external-tooth gears 5a, 5b, an annular support ring 17 receiving a rotation corresponding to the rotational component of the inner pin 7 (=the rotational component of the external-tooth gears), and a carrier pin 16 projected from the flange part 14 formed at the output shaft 2, connected and fixed to the support ring 17.

The inner pin 7 is rotatably fitted to the flange part 14 and the support ring 17 through bushes 18a, 18b. That is, since the inner pin 7 is not necessarily tightly connected to the output shaft 2 due to the presence of the carrier pin 16, it can be made to be rotatable itself, resulting in that the prior art inner roller 8 can be eliminated. The annular support ring 17 is assembled to an extremity end portion of the carrier pin 16. Since the carrier pin 16 only has the function of transmitting a rotational force of the support ring 17 to the output shaft, there are provided big through-holes 20a, 20b which do not interfere with the carrier pin 16 even if the carrier pin 16 oscillates at the corresponding portion on the external-tooth gears 5a, 5b.

Incidentally, in FIG. 8, reference numerals 15a, 15b denote bearings of the output shaft 2. Reference numeral 21 denotes an inner pin keep plate for determining an axial position of the inner pin 7. Reference numeral 23 denotes an inner pin keep bolt. Reference numeral 22 denotes a steel plate race.

It should be noted that in the inscribed meshing type planetary gear construction as described above, the reduction ratio can be freely changed merely by changing the external-tooth gears 5a and 5b, the internal-tooth gear 10, the outer pin 11 and the eccentric bodies 3a and 3b.

Therefore, there is prepared in advance a sub-series of devices (this sub-series will be hereinafter referred to as a "frame number") in which specific sets of dimensions, referred to as tie-in dimensions with respect to a mating machine determined by dimensions of the output shaft 2 and the casing 12 are categorized into small to large sizes in response to the market. That is, the devices in one sub-series all have the same output shaft size and the same casing size, regardless of reduction ratio. Additionally, the kinds of speed change ratios are systematized and prepared in advance in the same frame number to thereby enable meeting the needs of a variety of users.

Specifically, in the known arrangement, those having a reduction ratio of 1/6 to 1/119, a combination of a motor of 0.1 Kw to 132 Kw and an output torque of 0.35 kgm to 6000 kgm are prepared according to a plurality of frame numbers.

Generally, in the inscribed meshing type planetary gear construction, parts are used in common with each other in the same frame number. In this manner, only one kind of the eccentric bearings 4a and 4b have been used since they are bearings which need be produced in volume.

It is to be noted that an eccentric amount of a low reduction ratio is large whereas an eccentric amount of a high reduction ratio is small in terms of a relation-ship between the reduction ratio and the eccentric amount. Specifically, generally, for those shown in FIGS. 5 and 6, when A is the pitch radius of the internal-tooth gear, 1/N is the reduction ratio and e is eccentric amount, $e = 0.5$ to $1.5$ $A/N$ is set.

Accordingly, in the low reduction ratio (N: small), the eccentric amount e is large, and therefore, the thickness t1 of the eccentric members 3a and 3b and the input shaft 1, and the thickness t2 of the key way are required to be secured. So, the inside diameter d2 of the eccentric bearings 4a and 4b is determined with respect to the diameter d1 of the input shaft 1. Because of this, in order to obtain the eccentric bearings 4a and 4b having a large load capacity with the aforesaid inside diameter d2, cylindrical roller bearings are generally employed as previously mentioned, and a part of the external-tooth gears 5a and 5b serves as the outer races thereof to effectively utilize space.

It is to be noted that in the case of the high reduction ratio (N: large) with the corresponding small eccentric amount e, the thicknesses t1 and t2 are needed for strength, and thus more than as needed, and the space efficiency is poor.

On the other hand, in the combination of the same motors, the higher the reduction ratio, the larger the output torque. The load of the eccentric bearings 4a and 4b also tends to be large accordingly. Therefore, since the output torque is restricted by the load capacity of the eccentric bearings 4a and 4b, in the case where within the same dimension, deep-groove ball bearings having a relatively smaller load capacity than that of the cylindrical roller bearings are used, a large torque is not provided. Under these circumstances, the deep-groove ball bearings which have a high general-use property and are low in cost cannot be used. Particularly, on the side of the high reduction ratio, the cylindrical roller bearings of high cost are often unavoidably employed to avoid the restriction by limited load capacity of the eccentric bearings.

SUMMARY OF THE INVENTION

The present invention has been achieved in view of these prior art problems. It is an object of the present invention to solve the above-described problems and provide a series of speed-increasing and reduction gear devices employing an inscribed meshing type planetary gear construction in which particularly, eccentric members and eccentric bearings from a low reduction ratio device to a high reduction ratio side in the same frame number or sub-series are rationally set, parts are used in common with each other without giving rise to problems such as the lowering of strength, and bearings which are low in cost and have a high general-use property can be used also in the high reduction ratio side.

In the case where the aforesaid inscribed meshing type planetary gear construction is utilized as a speed increasing gear, when the aforementioned "reduction ratio", "high reduction ratio", and "low reduction ratio" are replaced by "speed increasing ratio", "high speed increasing ratio" and "low speed increasing ratio", respectively, the exactly similar discussion will result. Hereinafter, in the case where both concepts are included, the words "speed change ratio", "high speed change ratio" and "low speed change ratio" will be used.

For solving the aforementioned problems, according to the present invention, there is provided a series of speed increasing and reduction gear devices employing an inscribed meshing type planetary gear construction comprising a first shaft, an eccentric body provided on the first shaft, an eccentric bearing mounted in the outer periphery of the eccentric body, an external-tooth gear mounted in the outer periphery of the eccentric bearing in a state where the gear can be rotated eccentrically around the first shaft, an internal-tooth gear with which the external-tooth gear is inscribed and meshed, and a second shaft connected to the external-tooth gear through means for transmitting only the rotation component of the external-tooth gear, characterized in that the series is constituted by an assembly of sub-series in which a speed change ratio differs from a low speed change ratio to a high speed change ratio but a tie-in dimension for installation thereof to a mating machine is the same, and in the same sub-series, a diameter of the first shaft is set to be the same and an outside diameter of the eccentric bearing is set to be the same, each low speed change ratio device comprising a combination of an eccentric bearing having a large inside diameter and an eccentric body having a large diameter whereas each high speed change ratio side comprising a combination of an eccentric bearing having a small inside diameter and an eccentric body having a small outside diameter.

In the present invention, in the same frame number (in the same sub-series) of devices, the diameter of the first shaft (the input shaft in the aforementioned prior art) is set to be the same and the outside diameter of the eccentric bearing is also set to be the same in spite of a plurality of speed change ratios prepared.

Further, each low speed change ratio device comprises a combination of an eccentric bearing having a large inside diameter and an eccentric body having a large outside diameter whereas the high speed change ratio device of the same sub-series comprises a combination of an eccentric bearing having a small inside diameter and an eccentric body having a small outside diameter.

As the result, a large thickness of an eccentric body can be secured as a consequence in the low reduction ratio device, and therefore, a large eccentric amount e can be easily obtained. Incidentally, on the low speed change ratio side, since the outside diameter of the eccentric bearing is defined to be the same in the speed change ratio, a difference (thickness) between inside and outside diameters of the eccentric bearing is inevitably small. However, in the case of the low reduction ratio, a necessary load capacity is small. Therefore, no problem occurs particularly.

On the other hand, since the eccentric bearing having a large difference (thinkness) between the inside and outside diameters can be incorporated on the high reduction ratio side, bearings, for example, such as deep-groove ball bearings which are low in cost and have a general-use property, and can easily provide the necessary accuracy can be employed despite the fact that a handling torque is large. Accordingly, the lower cost and the higher accuracy can be realized as compared to prior art cylindrical roller bearings.

Incidentally, at all of the reduction ratios, since the diameter of the first shaft is defined to be the same, the thickness of the eccentric body is inevitably thin on the high speed change ratio side. However, on the high speed change ratio side, the eccentric amount e is small, and therefore, no problem occurs particularly even the thickness of the eccentric body is thin.

As the result, an extremely rational setting with respect to dynamics can be carried out on the low and high speed change ratios within the same frame number. Moreover, the diameter of the first shaft is the same at each speed change ratio and the outside diameter of the eccentric bearing, that is, the diameter of the eccentric bearing provided on the external-tooth gear is the same at each speed change ratio. Therefore, parts in the same frame number can be promoted to be used in common with each other.

In this case, the outside diameter of the eccentric body (the inside diameter of the eccentric bearing) is different between the low and high reduction ratios. However, in the state where the eccentric bearing is fitted to the eccentric body, the inside diameter and outside diameter of the two members are the same, thus making easy the assembling work.

As in the foregoing, according to the present invention, largest parts can be used in common with each other after the rotational dynamic strength can be secured on the low and high reduction ratio sides. Furthermore, an excellent effect can be obtained in which a general-use bearing which is low in cost and has a high accuracy can be used.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Figure 1:
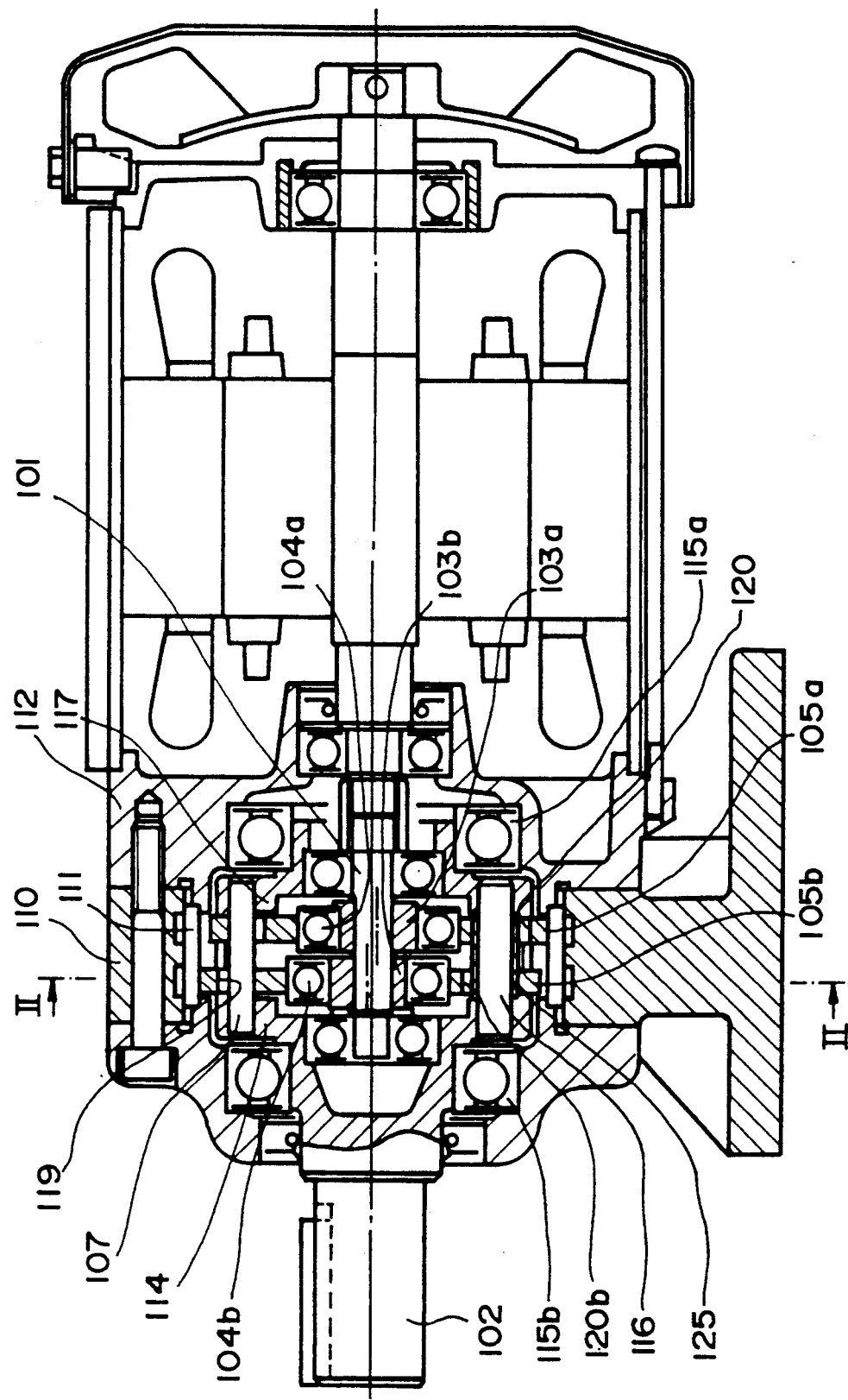
FIG. 1 is a sectional view showing an embodiment of a reduction gear device having a low reduction ratio among reduction gears employing an inscribed meshing type planetary gear construction according to the present invention.

Preferred embodiments of the present invention will be described in detail with reference to the drawings.

Since the basic construction of the present embodiment is similar to that of the prior art previously described, reference numerals which are the same in later two figures are merely used for the same or similar parts in the drawings and a duplicate description will be omitted, and only the parts particularly relating to the present invention will be described in detail.

Figure 2:
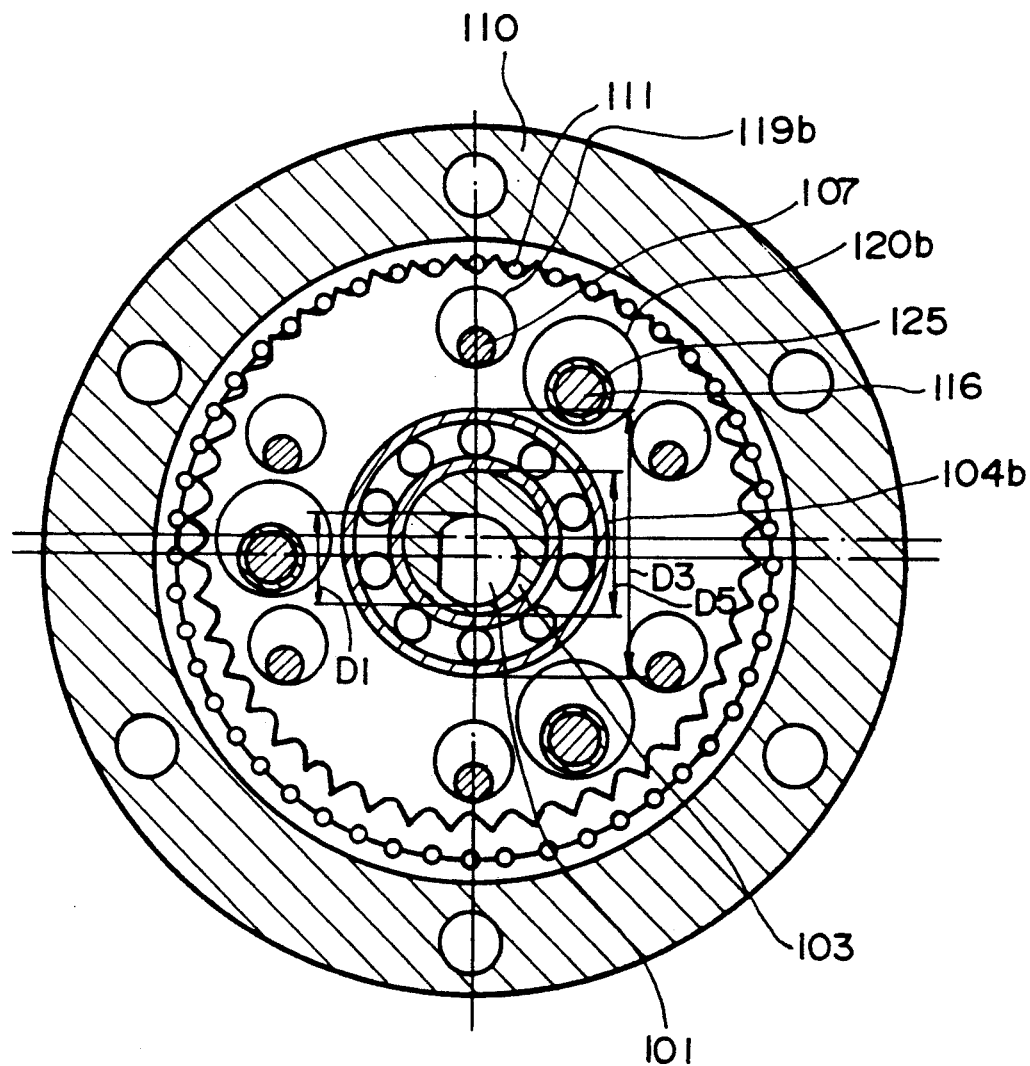
FIG. 2 is a sectional view taken on line II—II of FIG. 1.

FIG. 1 shows an example of a reduction gear device having a low reduction ratio according to an embodiment of the present invention. FIG. 2 is a sectional view taken on line II—II of FIG. 1. An internal-tooth gear 110 has 48 teeth, and an external-tooth gear 105b (105a) has 44 teeth. Since a difference in teeth between both internal and external gears is 4, the reduction ration is 4/44 (=1/11).

Figure 3:
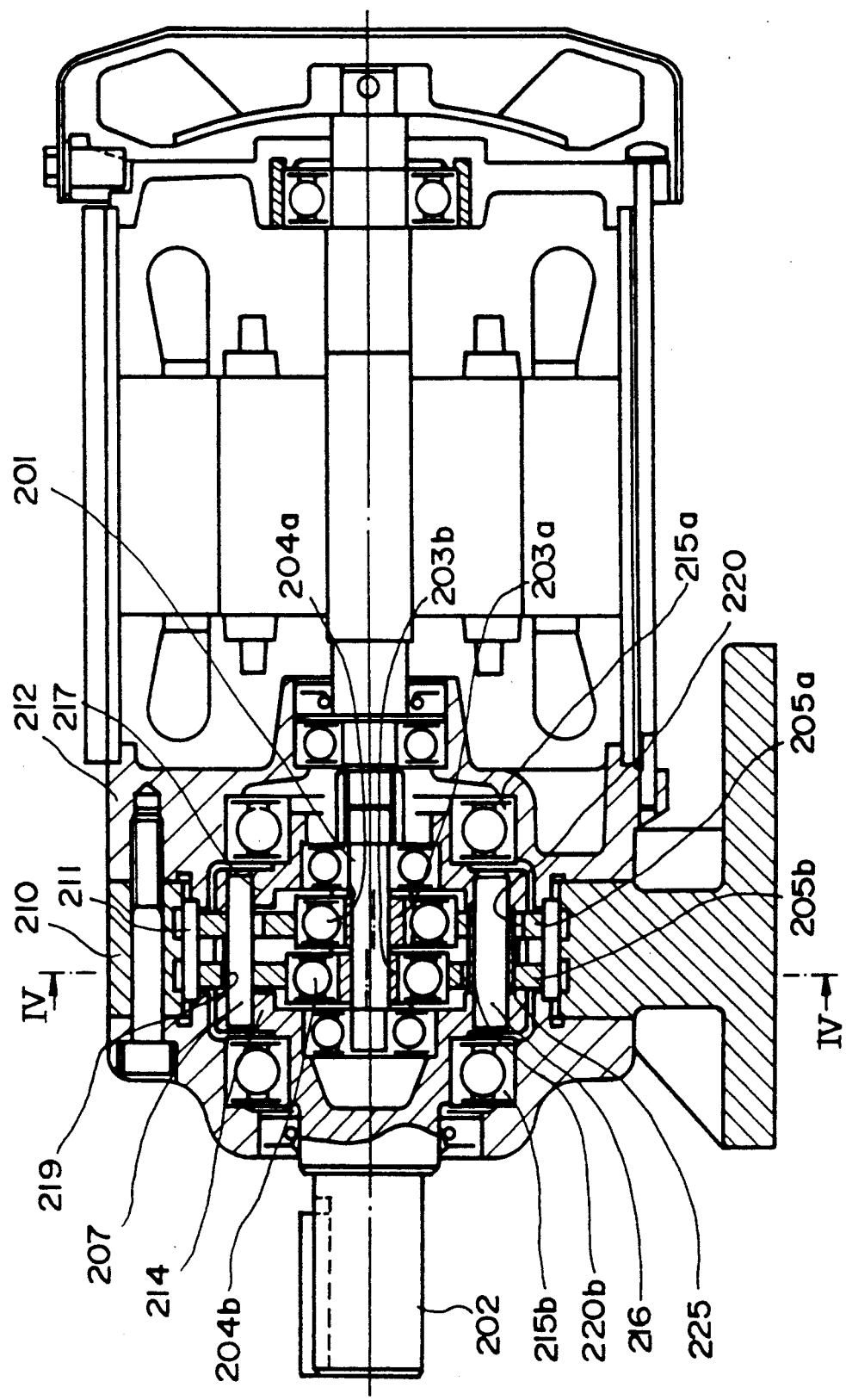
FIG. 3 is a sectional view corresponding to FIG. 1 showing an embodiment of a reduction gear device of a high reduction ratio among reduction gears employing an inscribed meshing type planetary gear construction according to the present invention.
Figure 4:
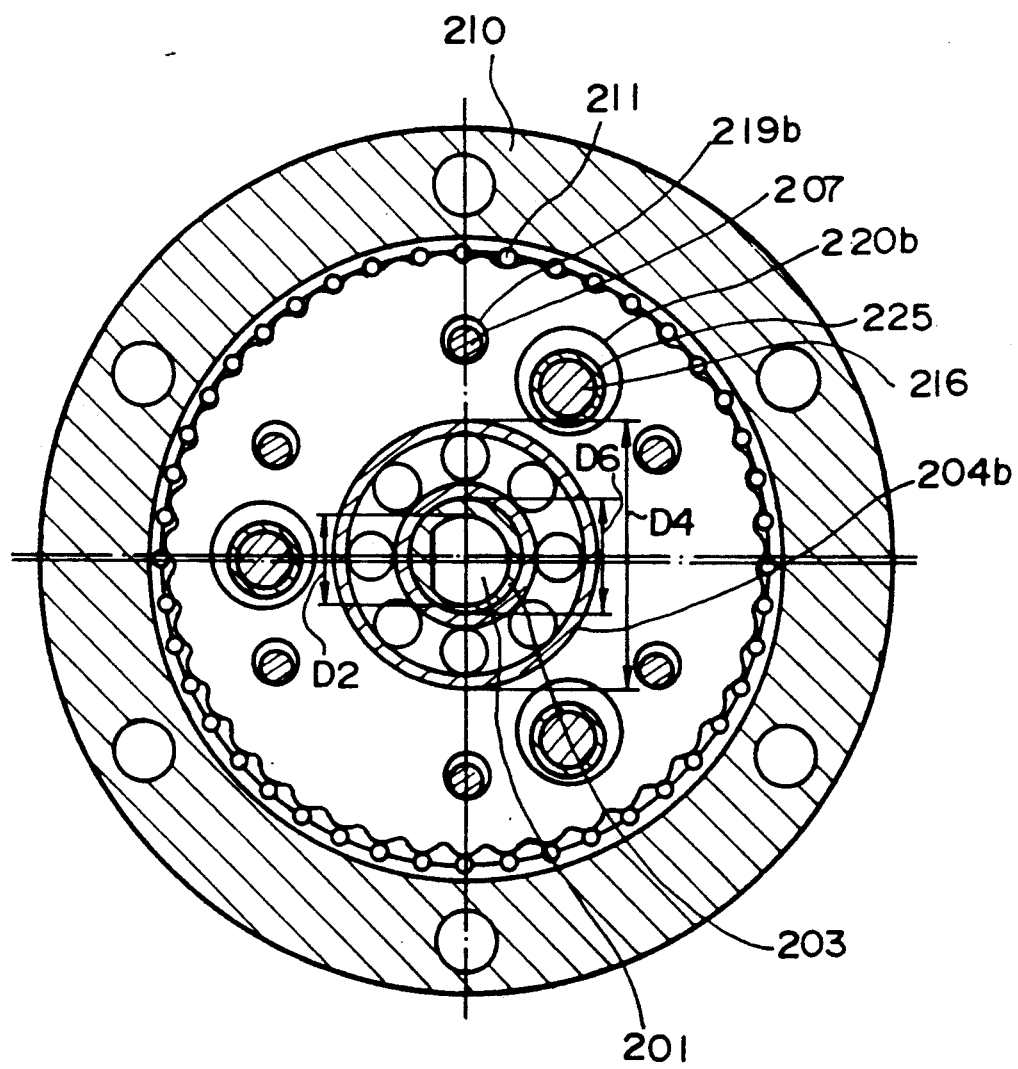
FIG. 4 is a sectional view taken on line IV—IV of FIG. 3.
Figure 5:
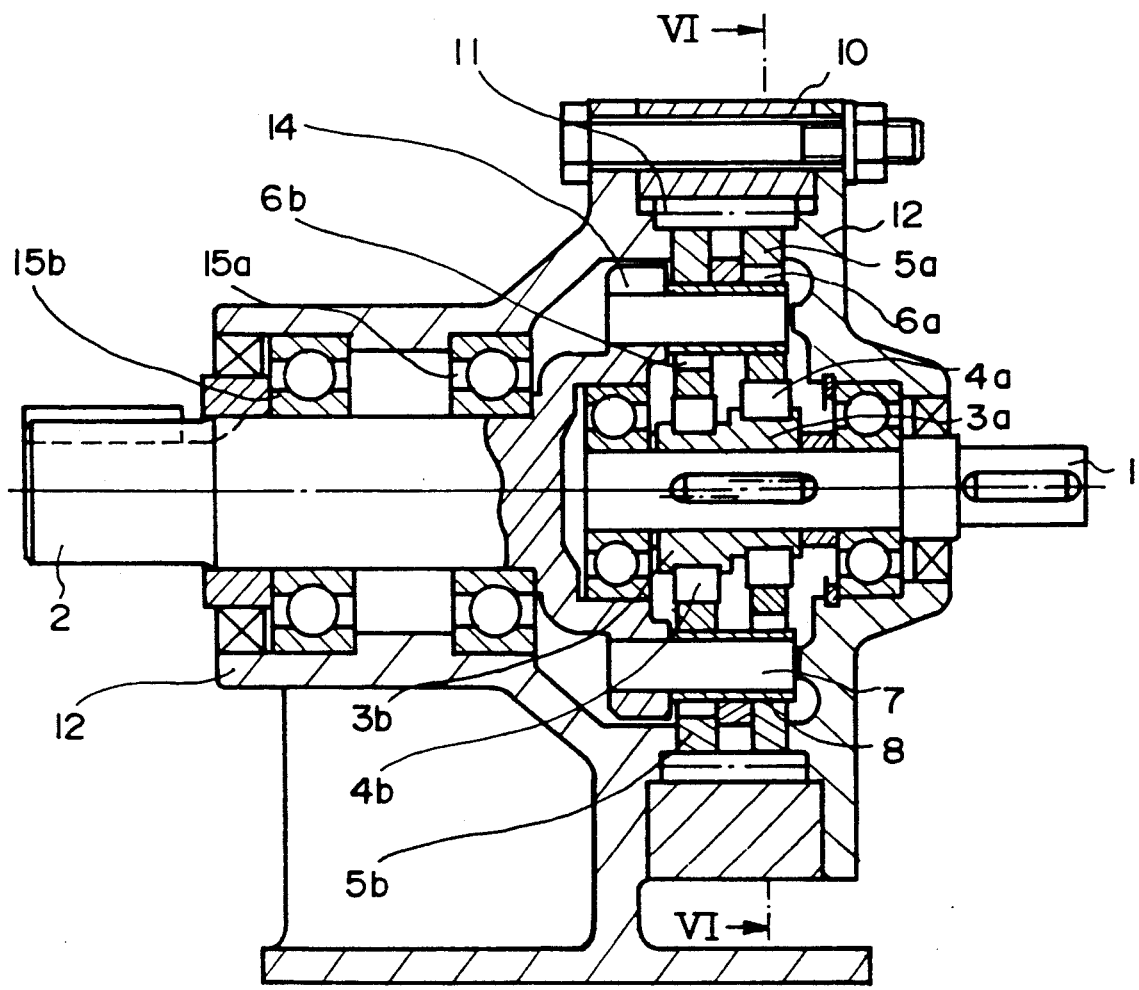
FIG. 5 is a sectional view of a reduction gear device to which is applied a conventional prior art inscribed meshing type planetary gear construction.
Figure 6:
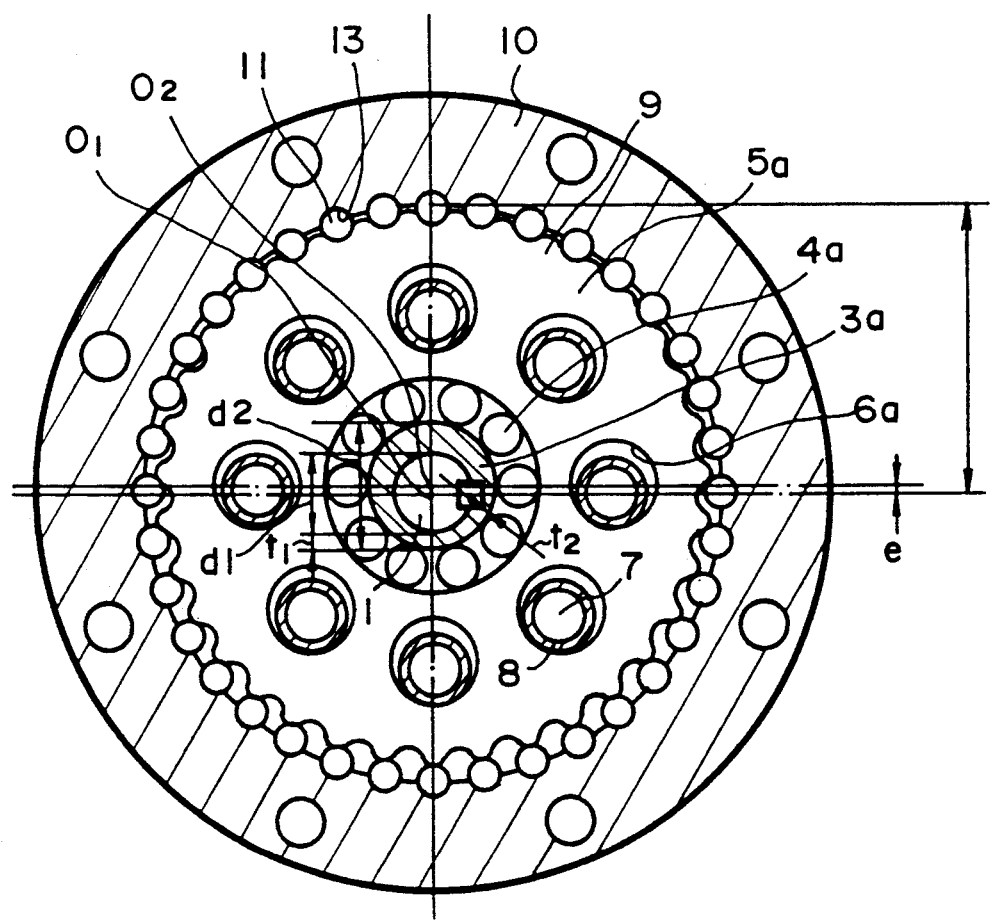
FIG. 6 is a sectional view taken on line VI—VI of FIG. 5.
Figure 7:
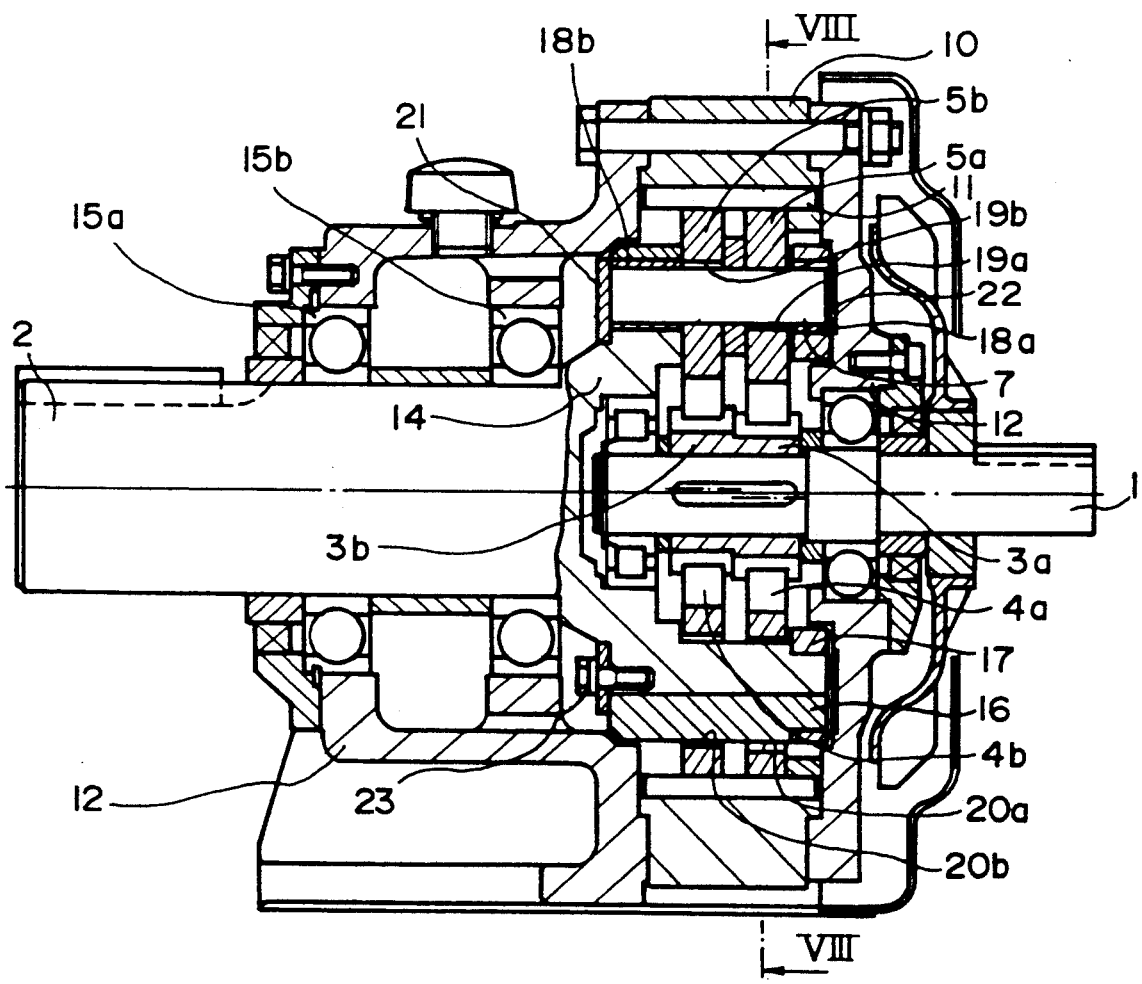
FIG. 7 is a sectional view of a reduction gear device to which is applied a conventional inscribed meshing type planetary gear construction, the reduction gear being provided with a carrier pin in addition to an inner pin.
Figure 8:
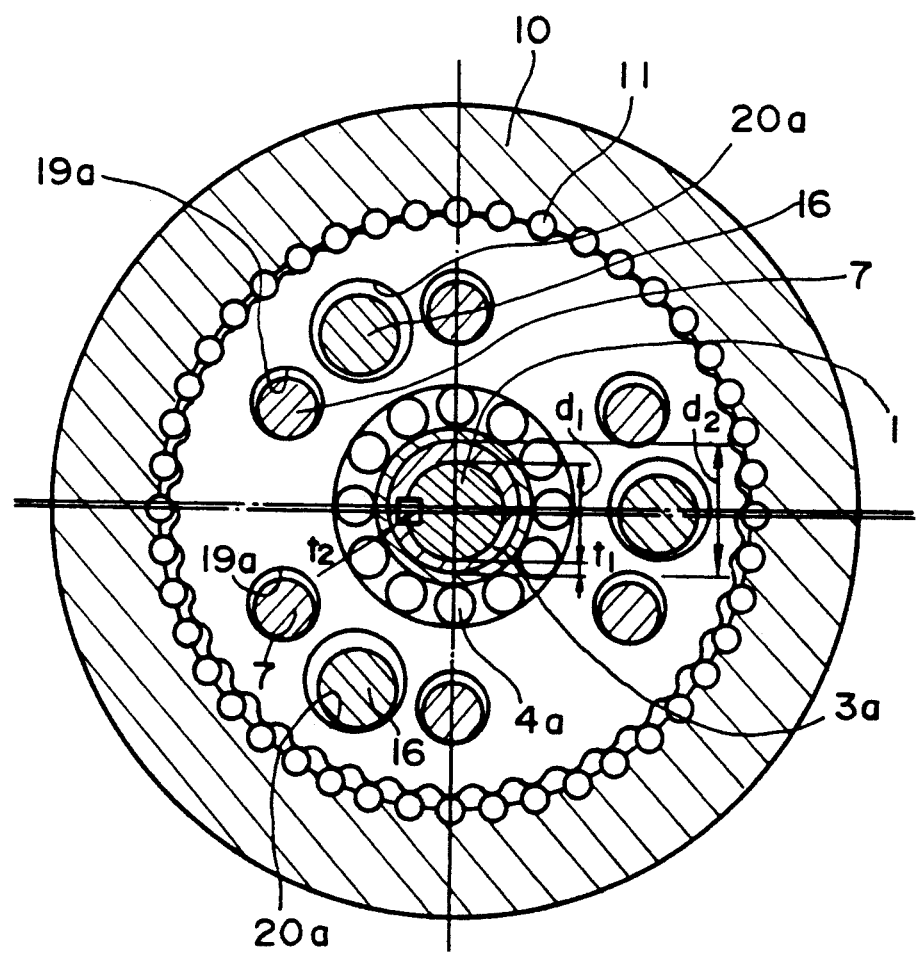
FIG. 8 is a sectional view taken on line VIII—VIII of FIG. 7.

On the other hand, FIG. 3 shows an example of a reduction gear device having a high reduction ration according to a further embodiment of the present invention. FIG. 4 is a sectional view taken on line IV—IV of FIG. 3.

An internal-tooth gear 21 has 44 teeth, and an external-tooth gear 205b (205a) has 43 teeth. Since a difference in teeth between internal and external gears is 1, the reduction ratio is 1/43.

In both the first and second embodiments, deep groove ball bearings 104a, 104b, 204a and 204b (as eccentric bearings) which are for general use and can easily provide high accuracy are fitted in eccentric bodies 103a, 103b, 203a and 203b, respectively.

As will be apparent from comparison between FIGS. 2 and 4, a diameter D1 of an input shaft 101 is equal to a diameter D2 of an input shaft 201. Also, an outside diameter D3 of the eccentric bearings 104a and 104b is equal to an outside diameter D4 of the eccentric bearings 204a and 204b. These two embodiments are of the same sub-series or frame number and therefore, have the same tie-in dimension.

An inside diameter D5 of the eccentric bearings 104a and 104b and an inside diameter D6 of the 204a and 204b are large for the eccentric bearings 104a and 104b on the low reduction ratio device of FIGS. 1 and 2, and are small for the eccentric bearings 204a and 204b on the high reduction ratio side of FIGS. 3 and 4 (D5>D6). More specifically, in the low reduction ratio device, the eccentric bearings (deep groove ball bearings) 104a and 104b having a small diameter symbol in the nominal number of bearing and the eccentric bodies 103a and 103b having a large outside diameter are provided as a set, whereas in the high reduction ratio device, the eccentric bearings (deep groove ball bearings) 204a and 204b having a large diameter symbol in the nominal number of bearing and the eccentric bodies 203a and 203b having a small outside diameter are provided as a set. In this embodiment, in FIGS. 1 and 2, there are 60 series, and in FIGS. 3 and 4, there are 62 series.

As the result of the above structure, even on the low reduction ratio side having a large eccentric amount e, sufficient thickness of the eccentric bodies 103a and 103b can be secured.

Further, on the high reduction ratio side which is small in eccentric amount e but large in torque used, the outside diameters of the eccentric bearings 204a and 204b are the same and the inside diameters thereof are set to be small. Therefore, a large sectional area of the eccentric bearings 204a and 204b can be secured, and the load capacity can be increased through that amount. Therefore, despite the fact that the deep groove bearings which are for general use (at low cost) and can easily provide high accuracy are used, sufficient strength can be obtained. Incidentally on the high reduction ratio side, the thickness of the eccentric bodies 203a and 203b becomes thin. However, on the high reduction ratio side, the eccentric amount e is small and particularly no problem occurs.

In addition, the diameters D1 and D2 of the input shafts 101 and 201 are the same, and the outside diameters D3 and D4 of the eccentric bearings 104a, 104b, 204a and 204b, that is, the diameters of the eccentric bearings for the external-tooth gears 105a, 105b, 205a and 205b are the same, and therefore, the common use of parts in the same frame number can be promoted.

In this case, the outside diameter of the eccentric body is different between the 103a and 103b on the low reduction ratio side and the 203a and 203b on the high reduction ratio side. However, in the state where the eccentric bearings 104a, 104b, 204a and 204b are fitted to the eccentric bodies 103a, 103b or 203a, 203b respectively, the outside diameter and inside diameter of the thus set two parts are the same, thus facilitating assembling work.

It is further understood by those skilled in the art that the foregoing description is a preferred embodiment of the disclosed device and that various changes and modifications may be made in the invention without departing from the spirit and scope thereof.

What is claimed is:

1. A series of speed increasing and reduction gear devices employing an inscribed meshing type planetary gear construction comprising a first shaft, an eccentric body provided on the first shaft, an eccentric bearing mounted in an outer periphery of said eccentric body, an external-tooth gear mounted in an outer periphery of said eccentric bearing in a state where said external-tooth gear can be rotated eccentrically ground said first shaft, an internal-tooth gear with which said external-tooth gear is inscribed and meshed, and a second shaft connected to said external-tooth gear through means for transmitting only the rotation component of said external-tooth gear, characterized in that said series of devices is constituted by an assembly of sub-series of devices in which a speed change ratio of the devices of the sub-series differ from a low speed change ratio to a high speed change ratio but a tie-in dimension of the devices in the sub-series for installation thereof to a mating machine is the same, and in the same sub-series, a diameter of said first shaft is set to be the same for each one of devices and an outside diameter of said eccentric bearing is set to be the same for each one, each low speed change ratio device comprising a combination of said eccentric bearing having a large inside diameter and said eccentric body having a large diameter whereas each high speed change ratio device comprising a combination of said eccentric bearing having a small inside diameter and said eccentric body having a small outside diameter.

* * * * *